United States Patent [19]
Copeland et al.

[11] Patent Number: 5,659,613
[45] Date of Patent: Aug. 19, 1997

[54] METHOD AND APPARATUS FOR COPY PROTECTION FOR VARIOUS RECORDING MEDIA USING A VIDEO FINGER PRINT

[75] Inventors: Gregory C. Copeland, San Jose; John O. Ryan, Cupertino, both of Calif.

[73] Assignee: Macrovision Corporation, Sunnyvale, Calif.

[21] Appl. No.: 473,047

[22] Filed: Jun. 7, 1995

Related U.S. Application Data

[63] Continuation-in-part of Ser. No. 267,635, Jun. 29, 1994, Pat. No. 5,513,260, and Ser. No. 294,983, Aug. 24, 1994.
[51] Int. Cl.$^6$ ................................................. G11B 23/28
[52] U.S. Cl. ..................... 380/3; 380/4; 380/5; 360/60
[58] Field of Search ............................. 380/3–5; 360/60

[56] References Cited

U.S. PATENT DOCUMENTS

| | | | |
|---|---|---|---|
| 4,969,041 | 11/1990 | O'grady. | |
| 5,003,410 | 3/1991 | Endoh et al. | 360/60 |
| 5,003,590 | 3/1991 | Lechner et al. | 380/5 |
| 5,247,507 | 9/1993 | Morimoto et al. | 369/111 |
| 5,386,240 | 1/1995 | Hori | 380/5 X |
| 5,418,853 | 5/1995 | Kanota et al. | 380/5 |
| 5,513,260 | 4/1996 | Ryan. | |

FOREIGN PATENT DOCUMENTS

| | | |
|---|---|---|
| 400906 | 12/1990 | European Pat. Off.. |
| 545472 | 6/1993 | European Pat. Off.. |
| 96/06503 | 2/1996 | WIPO. |

*Primary Examiner*—Gilberto Barrón, Jr.
*Attorney, Agent, or Firm*—Gerow Brill

[57] ABSTRACT

A method and apparatus for copyright protection for various recording media such as Digital Video Discs (DVDs) uses a combination of a Video Finger Print Signal and an Authenticating Signature to permit the player to handle either copy-protected or non-copy-protected media, in a manner that is difficult to compromise. Both a Video Finger Print Signal and an Authenticating Signature are recorded on the media only when copy-protection is required. The nature of this Authenticating Signature is such that it will not be transferred to illicit copies made on CD recorders. When either an original protected or an original non-protected disk is played, the presence or absence of the Authenticating Signature causes the player to correctly play the program video. All original DVDs therefore play normally. When a copy of a non-protected CD is played, the absence of the Video Print Signal also causes the player to correctly playback the video signal data. However, when a copy of a protected CD is played, the absence of the Authenticating Signature causes the player to prohibit the disk from playing normally.

10 Claims, 1 Drawing Sheet

METHOD AND APPARATUS FOR COPY PROTECTION FOR VARIOUS RECORDING MEDIA USING A VIDEO FINGER PRINT

CROSS REFERENCE TO RELATED APPLICATIONS

This application is a Continuation-in-Part of application Ser. No. 08/267,635 ('635), filed Jun. 29, 1994 entitled METHOD AND APPARATUS FOR COPY PROTECTION FOR VARIOUS RECORDING MEDIA by John O. Ryan, now U.S. Pat. No. 5,513,260. This application is also a Continuation-in-Part of application Ser. No. 08/294,983 ('983), filed Aug. 24, 1994 entitled A Video Finger Print Method and Apparatus.

BACKGROUND

The optical compact disc (CD) is universally recognized as a superb medium for storage of digital data. Its high packing density, low manufacturing cost and relative immunity to mishandling are unmatched by other media. The success of the CD as a carrier of high fidelity audio is likely to be repeated in the realm of Multimedia, where the technology has been adapted to the broader task of storing digitized audio, video and alphanumeric information for a variety of purposes, conforming to a plethora of standards such as DVD, CD-ROM, CD-Video, CD-I, etc.

To date, CD ROM software copyright owners have not had to contend with the rampant piracy (unauthorized copying) that afflicts the videocassette and audiocassette media. This is almost entirely due to the large capital investment costs associated with mastering and replicating CDs, which creates substantial financial barriers to piracy. However, compact disc recording machines capable of making perfect copies of data from pre-recorded CDs are now available for professional users for about two thousand dollars and it is very likely that a few years from now, consumer affordable player-recorders will be widely available. This will create a serious conflict between software producers' needs to sell their product for $50+ to make a profit, and the consumers' resulting ability to make a perfect copy for the price of a blank disc, projected to be in the $10 to $20 range soon. The problem is likely to be much more severe than the piracy afflicting the video business, because, while few people want to watch a movie more than once, many Multimedia software products are intended to be used repeatedly, so that ownership rather than rental is likely to be the norm.

The fundamental problem solved by this invention is to ensure that consumers can only enjoy a software manufacturer's products by playing legitimately manufactured CDs.

One approach to his piracy problem would be the inclusion of special anti-copy circuitry within CD-recorders, mandated by general agreement between the manufacturers, similar to the Serial Copy Management System (SCMS) developed for the Digital Audio Tape (DAT) medium. With this scheme the CD-recorder would look for a special copy-prohibit instruction in the digital data and on finding it, would stop recording. However, such a system offers very limited protection. Even when the SCMS system was first proposed for the DAT medium, it was fully appreciated that it presented little protection from professional or even amateur pirates, who, knowing the data format, could, and subsequently did, build inexpensive "black boxes" (electronic circuits) to remove the copy-prohibit instruction thereby enabling the recorders to make unlimited copies.

The applicants believe that all anti-copy systems relying on copy-prohibit instructions inserted in the data stream can be defeated by black boxes of the same order of complexity and cost at that of the circuitry within the CD-recorder that looks for these instructions. Such systems are therefore of limited effectiveness. The black box would be connected in line between a CD-player and a CD-recorder and would look for the special copy-prohibit instructions in the data stream and simply remove or modify these instructions. It is to be expected, therefore, that if this kind of anti-copy system were adopted, inexpensive black boxes would proliferate.

A further difficulty with this approach to copy protection is the need to ensure that all CD-recorder manufacturers include the necessary detection circuitry in their products. Some manufacturers may not comply, perhaps in the expectation of increasing their market share. The presence of even a small percentage of non-complying machines in the marketplace could jeopardize the viability of this type of copy-protection scheme.

For the foregoing reasons, there is a need for a copy-protection system for the compact disc medium that provides a high level of protection to software rights owners, that is immune to black boxes and that is not compromised by the refusal of a few hardware manufacturers to comply with the standard.

SUMMARY OF THE INVENTION

According to the invention, a Conditional Play System provides copyright protection for previously recorded material on various media, for example compact disc media or Digital Video Disks. Since the invention to be described is applicable to many different media and one of average skill in the art could readily adapt the teachings of this invention to other media, the description which follows will describe its application to the Digital Video Disk (DVD) medium a version of compact disk media.

The invention overcomes the disadvantages of the above-described system. The Conditional Play System does not attempt to prevent DVD-recorders from copying the data from protected DVDs. Instead, it is a method by which DVD-players can determine whether a particular DVD is a legitimate original or an illicit copy. If legitimate, the player plays the DVD normally. If not, the player shuts down and may display an appropriate copyright warning message.

During manufacture of the master disk, an Authenticating Signature is impressed on the disc in a manner that cannot be read by a DVD-player's normal optical pickup, but which can easily be detected by other means. The nature of this Authenticating Signature is such that it is faithfully transferred to all production disks made from this master. However, if an illicit copy of a production disk is made using a DVD-recorder, the copy may contain a faithful replica of the disk's program data, but the Authenticating Signature is not transferred to the copy. All DVD-players conforming to this copy protection standard would include a subsystem to search for the Authenticating Signature. If the signature is not found, the DVD-player will not play the disk.

For compact disk applications such as the DVD, the Authenticating Signature is preferably impressed on the master disk by radially position modulating the writing head that creates the master disk by a few tens of nanometers peak-to-peak about the head's normal position. This Authenticating Signature can then be read in the DVD-player with a minimal increase in player complexity by taking advantage of the player's existing radial tracking servo system, as will now be described.

In all DVD-players, the optical reading head is maintained on track by a sophisticated error detection systems, as a normal part of the player's function. If, for example, the head moves slightly toward one or other side of the track, or the track moves from under the head due to an off center spindle, an error is detected and, after amplification, is applied to the radial actuator to re-center the head of the track. Since the optical reading head must also track a deliberately induced radial position-modulation defining an Authenticating Signature, this error voltage therefore contains a signal component corresponding to this, along with other signals corresponding to elliptical errors and the like. Therefore, by appropriate processing of this error voltage, the Authenticating Signature can be detected.

The position-modulation signal may be a simple sinusoid of frequency such that either an integral number of cycles is impressed during each revolution of the disk, or one complete cycle is impressed during an integral number of revolutions of the disk. In either case, extraction of the Authenticating Signature from the various other tracking error signals is simplified. A relevant type of abnormal scanning is described in U.S. Pat. No. 5,247,507 by Morimoto (incorporated by reference) that describes a wobble of the normal tracking signal causing the tracking to meander in a sinusoidal path about a mean frequency.

Clearly this copy protection system cannot be compromised by any external black box connected between a DVD-player's signal output and a DVD-recorder's signal input, since the Authenticating Signature is not transferred to the recorder.

Neither is the system compromised if a few manufacturers choose not to build the authenticating system into their DVD-players, because pirate disk makers would have to label their products as capable of being played only on the limited set of non-complying DVD-players on the market. The pirate disk maker would in effect be advertising the illegality of their product and inviting prosecution.

Three forms of such a Conditional Play Systems are described herein. A common element of all three Conditional Play Systems is the use of the special Authenticating Signature described above, which is impressed on legitimately manufactured DVDs or other media, in a manner such that this Authenticating Signature is not part of the recorded "program" signal and is therefore not passed on to an illicit copy.

The first of these Conditional Play Systems requires that all DVD players conforming to the particular standard in question—DVD, for example—must look for Authenticating Signature on each individual DVD to be played. The DVD player's control system would be designed to stop playing the DVD if the Authenticating Signature were missing. Since, as stated earlier, an illicit copy of a DVD would not have the Authenticating Signature, such copies would in effect be useless. Effective copy-protection is therefore accomplished even though the illicit copy may contain a perfect replica of the program information.

The disadvantage of this first system is that all legitimate DVDs which are intended to be played on these special DVD-players must have an Authenticating Signature added. This system is therefore only suitable for closed systems wherein a systems controller can mandate that all DVDs be copy-protected. However, it is desirable from a commercialization viewpoint to be able to offer and charge for copy-protection on a program-by-program basis. The second and third Conditional Play Systems to be described below have this capability.

In a second Conditional Play System, DVDs to be copy-protected would contain a special instruction to tell all DVD-players to look for the Authenticating Signature and to not play such DVDs in the absence thereof. The instruction could be recorded, for example, on the initialization section of the DVD—the part normally reserved for non-program information. The instruction would be acted upon by a special sub-system in all compliant DVD-players. Thus, only originals of copy-protected DVDs could be played—illicit copies would be rejected. This instruction would be omitted from DVDs of programs which did not require copy-protection and for such programs both original DVDs and copies thereof would play normally. In this manner copy-protection could be offered on a program-by-program basis through the use or non-use of this "Look For An Authenticating Signature And Play Only If Found" instruction.

However, although this second Conditional Play System allows the copy-protection feature to be offered on a program-by-program basis, it could in principle be compromised by special black boxes connected in the signal line between the DVD-player and the DVD-recorder. These black boxes would search for this "Look For—" instruction in the data stream from the DVD-player and remove or modify it so that the resultant illicit copy would not trigger the authenticating procedure in DVD-players.

A third Conditional Play System, called the Programmable Conditional Play System (PCPS) overcomes the disadvantages of the above described systems and provides a copy-protection scheme which can be activated on a program-by-program basis and which is also highly resistant to black box attack. This was fully described in the '983 application.

The concepts in the '983 application are applicable to a system wherein only licensed, so called legitimate manufacturers, could actually make disks. The status of the system rests on the need to encrypt the data going on the disk under a public encryption and the private key. These keys have to be kept at each legitimate manufacturer of the master disk. If one is trying to protect a consumer recordable device one has to be able to make disks to play on their own machines for their own use. With this in mind the system as described above would lack the required security once you start giving out the keys to everybody. Therefore the value of the above rests in a closed system. Since a user does not want anybody else making disks to play on these machines, it is not advisable to have an open format. In the event that somebody would make a universal disk recording that just happened to be able to play on these machines then the purpose of this system would be defeated.

However, most new Digital Video Disk (DVD) formats being discussed are more open formats so that anybody should be able to make disks play in the players. It is anticipated that the next generation of digital formats will be have a consumer recorded product within five years. Consumers will be able to use it as they currently use their VHS Machines. Therefore any system requiring the data be laid down under only secret key as needed is less desirable.

A slightly different approach is needed called Finger Print Conditional Play System. To overcome the deficiencies of a closed system, one needs to add a flag in the video system that says the player is to play a disk only if you see a wobbly track or play the disk unconditionally. This signal cannot be easy to remove. This flag would replace the encryption/decryption system described in application Ser. No. 08/267,635. A method of accomplishing this flag is to add a video finger print signal to the input video at a low level. A similar video finger print system is described in the '983 application, filed Aug. 24, 1994 entitled A Video Finger Print Method and Apparatus by Gregory Copeland. The important elements of this video finger print are 1) low visibility in the video signal, 2) ease of detection and 3) difficulty of bypass effect. One can't just add a bit in the vertical blanking space because it is easily removed. In a video signal the viewer can tolerate a certain amount of noise or error. The finger print system like that described in the '983 application adds a small amount of low level lift that you cannot see, but that you can extract reliably.

With such a finger print system the goals listed above can be achieved. In the case of digital data one bit or one single error in one bit can destroy a complete computer program. The destruction can be anything from minor to catastrophic. In video you can have many errors in the signal as long as the net picture is perfectly fine, it doesn't matter.

The video finger print is easy to remove within the video domain. It is even relatively easy to remove in the digital video domain, but it is a very difficult to remove in the MPEG domain. Most relevant digital video systems will use one or more versions of the Motion Picture Experts Group format. These formats involve video compression techniques for more efficient data transfer. There is no way of looking at MPEG data and locating something. MPEG is a non-linear system. Therefore, there is nothing to which you can point in the MPEG data that would tell you that the video is being lifted or not lifted. A pirate would have to decode the MPEG signal to baseband video. At this point the finger print could be removed, but now the pirate has to recode it again to MPEG to make your disk. Encoding is a major operation. It is not a trivial thing. This is not a foolproof system, if somebody has access to an MPEG encoder. Such a device costs hundreds of thousands of Dollars.

To implement the video finger print, a Video Finger Print Signal is added to the video prior to MPEG encoding. The video finger print signal is implemented by adding a small amount of lift to field one, approximately one milli-volt to field one and subtracting a milli-volt of lift from field two. This would be done all the way through the movie or other video recording. The receiving device, would continuously store field one and then subtract it from field two. Because you are subtracting two opposites the Video Finger Print Signals add and the video signal subtracts out. The result is integrated over a period of time, a few seconds would suffice. A voltage will build up that can be detected. The player detects this signal after MPEG decoding. If the signal is present, the player knows that the disk is a copy protected disk. The player will look to see if the track is wobbly by looking at the servo signal. The detected flag in the video system says to the player to play a disk only if it sees an Authentication Signal. If no Video Finger Print Signal is detected, the player will not look for an Authentication Signal and will play unconditionally.

The above description is based upon the premise that the disk would be carrying a video signal. Many digital video disks may be used for computer data because of their great data handling capacity. However, it is likely that the vast majority of applications, the computer program will also involve video.

The description below describes an embodiment of the Fingerprint Conditional Play System in a DVD system.

DETAILED DESCRIPTION OF THE INVENTION

The present invention relates to a method and apparatus for copy-protecting various program distribution media, such as the Digital Video Disk (DVD). This invention is applicable to all disk media and the principles may be extended by one of ordinary skill in the art to other media such as magnetic tape. The invention offers a high level of protection to software rights owners, is immune to black boxes and will not be compromised by the refusal of a few hardware manufacturers to comply with the standard.

As mentioned earlier, it is desirable to be able to offer copy-protection to copyright holders on a program-by-program basis and to receive a per-program fee or a per-disk fee in return. This is accomplished in a Finger Print Conditional Play System (FPCPS) using a combination of a video finger print system and an authenticating signal to permit the DVD-player to handle either copy protected or non-copy-protected disks in a manner that is difficult or prohibitively expensive and time consuming to compromise, using black boxes.

Figure 1:
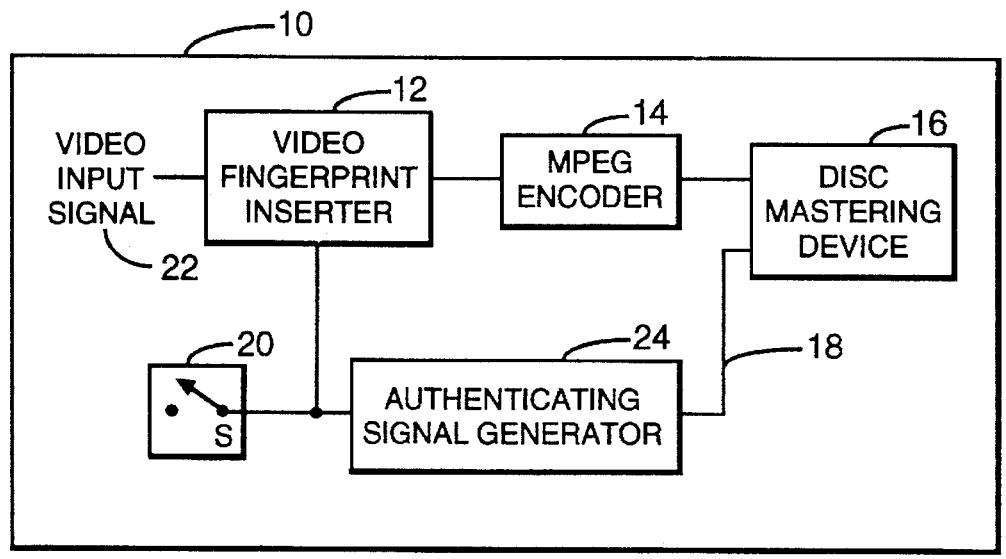
FIG. 1 is a block diagram of the mastering process hardware incorporating some elements of the invention.
Figure 2:
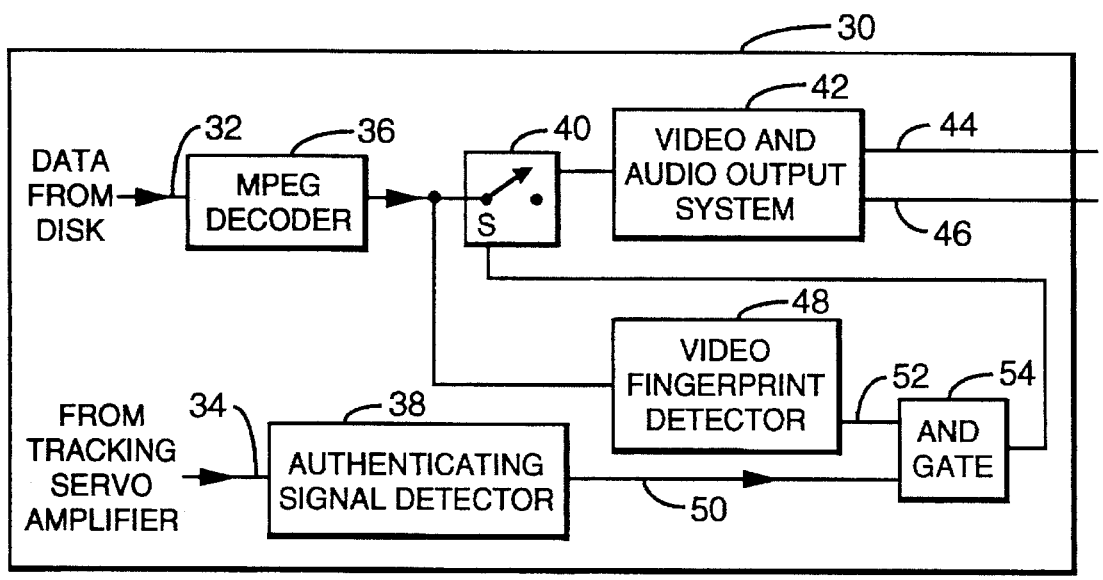
FIG. 2 is a block diagram of the compact disk playback device incorporating further elements of the invention.

An embodiment of the FPCPS encompasses a portion of a disk mastering device as in FIG. 1 and another portion in a DVD-player, as in FIG. 2.

The FPCPS Disk Mastering facility includes a copy protection recording apparatus 10 that accepts a video signal from the conventional source, input terminal 22, that is inputted to Video Finger Print Inserter 12. This conventional video source may be in a 525/60 format or a 625/50 format. Additionally, Video Finger Print Inserter 12 receives Copyright Material Command Signal 22 from Switch 20 to insert a Video Finger Print Signal into the video signal prior to MPEG encoding. The Video Finger Print Signal is implemented by adding a small amount of lift to field one, approximately one mill-volt, and subtracting a i-volt of lift from field two. This alternate field insertion is done all the way through the movie or other video recording. The Video Finger Print Inserter would insert the video finger print signal only when Switch 20 is in the Copyrighted position as shown in FIG. 1. When Switch 20 is in the Not Copyrighted position, no video finger print insertion takes place. The output of Video Finger Print inserter 12 is coupled to MPEG Encoder 14. MPEG Encoder 14 converts the conventional video signal with or without a video finger print signal to an MPEG Format signal. The output of MPEG Encoder 14 is coupled to the Disk Master Device for making master disks.

Switch 20 is also coupled to an input of Authentication Signature Generator 24. Authentication Signature Generator 24 generates an Authenticating Signature 18 the nature and purpose of which was described earlier. Line 18 connects the output Authenticating Signature Generator 24 to the radial actuator within the disk master system (not shown) only when the Copyrighted mode is selected by Switch 20.

The companion copy-protection apparatus 30 contained within the DVD-player, is shown in FIG. 2. MPEG program data from the DVD on line 32, appropriately decoded and error corrected, are inputted to MPEG Decoder 36 which converts the MPEG program data to a video signal which may or may not include a video finger print signal.

The output MPEG Decoder 36 is coupled to an input of Switch 40 and to an input of Video Finger Print Detector 48. Video Finger Print Detector 48 continuously stores field one and then subtracts it from field two of each frame. Video Finger Print Detector 48 is subtracting two opposite video finger print signal, the video fingerprint signals add and the video signal subtracts out. Video Finger Print Detector 48 integrates the result over a period of time, a few seconds would suffice. A build up voltage develops that can be detected. If the Video Finger Print Signal is present, the player knows that the disk contains copyrighted material. The output of Video Finger Print Detector generates a Copy Protection Signal 52 which is coupled to a first input of AND Gate 54.

The error signal from the DVD-player's radial tracking servo amplifier on line 34 is inputted to Authenticating Signal Detector 38. As explained earlier, this signal will have a component corresponding to the Authenticating Signature. Authenticating Signature Detector 38 is designed to generate a binary output on line 50 corresponding to the presence or absence of the Authenticating Signature at its input. For example this output may be a logical 1 in the presence of the Authenticating Signature and a logical 0 in its absence.

The logic levels are chosen so as to cause AND Gate 54 to cause an output when the Authenticating Signature is detected. AND Gate 54 outputs a signal 56 to OR Gate 58 when both the video finger print signal and the Authenticating Signature are detected. The second input to OR Gate 58 is output from Video Finger Print Detector only when no video finger print is selected. The output of OR Gate 58 is coupled to the selector of Switch 40 to connect the output of the MPEG Decoder to Video and Audio Output System only when both the Video Finger Print Signal and the Authenticating Signature signals are present or when the Video Finger Print Signal is not present.

We can now appreciate the operation of this Finger Print Conditional Play System by examining its response under different circumstances.

When an original copy-protected or non copy-protected disk is played, the presence or absence of the Video Finger Print Signal causes Switch 40 to correctly select the MPEG Decoded Video. Consequently, all original disks will be played normally.

When a copy of a non copy-protected disk is played, the absence of the Video Finger Print also causes switch S to correctly select the MPEG Decoded Video, again allowing such discs to play normally.

However, when an illicit copy of a copy-protected disk is played, the absence of the Authenticating Signature causes switch S to correctly not select MPEG Decoded Video signal.

The security of the Video Finger Print makes it very difficult or uneconomical for a pirate to make playable copies of protected disks.

To make playable copies of copy-protected discs, i.e., to defeat this scheme, a pirate must do one of the following:

1. Detect and remove the Video Finger Print signal.

2. Re-encode the video signal to an MPEG signal. As discussed above, this is very expensive.

3. Add a viable Authenticating Signature to illicit copies as the disks are being recorded, so that compliant DVD-players will play these disks normally. This is possible, but to do so the pirate needs to make major modifications to a DVD-recorder to enable it to lay down radially position-modulated tracks. Such modifications are well beyond the capabilities of consumers and software dealers. However, it is unrealistic to insist that a well-financed pirate operation could not find a way to do it. There are various ways to make it more difficult for a pirate to "forge" an Authenticating Signature, but these all depend to greater of lesser extent on the exact capabilities of the radial servo system (if any) on available DVD-recorders. For example, the signature may be in the form of an impulse function (rather than a simple sinusoid), such that the radial servo of a commercially available DVD-recorder might not be able to track it. Of course, if we allow this mythical pirate unlimited financial resources, he could invest in a professional disk mastering system and make the necessary modifications.

As a practical matter however, the ability of this system and method to eliminate piracy at the consumer, dealer and technically knowledgeable professional level, should be extremely valuable.

While the above embodiments have described a Finger Print Conditional Play System for DVDs and other compact disc formats, the principles are also applicable to a magnetic tape format. For such applications, the Authenticating Signature Signal could be added to the control track of the tape.

While the invention has been described in connection with preferred embodiments, it will be appreciated by those skilled in the art that various changes can be made without departing from its spirit. The coverage afforded applicants is defined by the claims and their equivalents.

We claim:

1. A method of providing copy-protection for a program distribution medium comprising the steps of:

adding an authenticating signature to a tracking portion of said media to be copy-protected;

inputting program data;

adding a finger print signal to said program data;

encoding said finger printed program data;

recording said encoded data on said media;

detecting said authenticating signature in a media player;

detecting said recorded encoded data from said media;

decoding said detected encoded data;

detecting said finger print signal;

inputting said decoded data to a data output device when said authenticating signal and said finger print signal are detected; and inputting said decoded data to said data output device when said finger print signal is not detected.

2. A method as recited in claim 1 wherein said program data comprises a video signal.

3. A method as recited in claim 2 wherein said finger print comprises a small additional lift to said video signal on a first field and a small lower lift a second field during multiple frames of said video signal.

4. A system of copy-protection for a program distribution medium comprising:

means for adding an authenticating signature to a tracking portion of said media to be copy-protected;

means for inputting program data;

means for adding a finger print signal to said program data;

means for encoding said finger printed program data;

means for recording said encoded data on said media;

means for detecting said authenticating signature in a media player;

means for detecting said recorded encoded data from said media;

means for decoding said detected encoded data;

means for detecting said finger print signal;

means for inputting said decoded data to a data output device when said authenticating signal and said finger print signal are detected; and means for inputting said decoded data to said data output device when said finger print signal is not detected.

5. A playback apparatus for copy-protection of a program distribution medium comprising:

- a first detector for detecting an authenticating signature from a tracking signal portion of said medium;
- a second detector for detecting recorded encoded data from said media;
- a decoder for decoding said detected encoded data;
- a third detector for detecting the presence of finger print signal within said decoded data;
- a fourth detector for detecting the presence of said authenticating signature and said finger print or the absence of said finger print signal;
- a selector controlled by said fourth detector to permit an output of said decoded data means for inputting said decoded data to a data output device when both said authenticating signature and said finger print are detected or the absence of said finger print is detected.

6. A method for providing copy protection in a recording process of a recording medium comprising the steps of:

- inputting a data stream
- inserting a finger print signal within said data stream;
- encoding said finger printed data stream;
- recording said finger print data stream on said recording medium;
- generating an authenticating signature signal; and
- coupling said authenticating signature signal to a time base control mechanism of a recording device to modify said time base control mechanism according to said authenticating signature signal.

7. A method as recited in claim 6, wherein said recording medium is an optical compact disc.

8. A method as recited in claim 6, wherein said recording medium is a DVD disc.

9. A method as recited in claim 6, wherein said recording medium is a magnetic tape.

10. A method as recited in claim 6, wherein said data stream is a video signal.

* * * * *

UNITED STATES PATENT AND TRADEMARK OFFICE
CERTIFICATE OF CORRECTION

PATENT NO. : 5,659,613
DATED : August 19, 1997
INVENTOR(S) : Gregory C. Copeland and John O. Ryan It is certified that error appears in the above-identified patent and that said Letters Patent is hereby corrected as shown below:

Column 1,
Line 67, after "on" insert "simple".

Column 2,
Line 2, change "at" to -- as --.
Line 21, after "that is" insert "relatively".
Line 34, change "Video" to -- Versatile --.
Line 34, after "medium" insert ",".
Line 35, insert "specific" before "version".
Line 35, change "compact disk media" to -- the optical compact disk. --.
Line 52, before "disk's" insert "original".
Line 60, after "disk" insert ",".

Column 3,
Line 5, change "of" to -- on --.

Column 4,
Line 53, change "recorded" to -- recordable --.

Column 6,
line 32, delete "22".
Line 36, change "a i-volt" to -- 1 millivolt --.,
Line 47, after "Device" insert -- 16 --.
Lines 52 and 61, after "output" insert -- of --.

Column 7,
Line 19, change "is" to -- and the Video Finger Print Signal are --.
Line 35, after "PrintSignal" insert -- and/or the Authenticating Signature --.

Figure 2 and the corresponding Figure on the Title page:
Insert an OR gate in the line extending from the AND gate 54 to the switch 40
Add a numeral 58 and a lead line extending to the OR gate.

UNITED STATES PATENT AND TRADEMARK OFFICE
CERTIFICATE OF CORRECTION

PATENT NO. : 5,659,613
DATED : August 19, 1997
INVENTOR(S) : Gregory C. Copeland and John O. Ryan It is certified that error appears in the above-identified patent and that said Letters Patent is hereby corrected as shown below:

Figure 2 contd.
Add a line extending from a second output of the fingerprint detector 48 to a second input of the OR gate 58.
Add a numeral 56 and a lead line extending to the output line from the AND gate 54.

Signed and Sealed this

Twenty-fifth Day of September, 2001

Attest:

NICHOLAS P. GODICI
Attesting Officer    Acting Director of the United States Patent and Trademark Office